United States Patent
Kang et al.

(10) Patent No.: US 12,223,566 B2
(45) Date of Patent: Feb. 11, 2025

(54) METHOD AND DEVICE FOR SYNTHESIZING BACKGROUND AND FACE BY CONSIDERING FACE SHAPE AND USING DEEP LEARNING NETWORK

(71) Applicant: KLLEON INC., Seoul (KR)

(72) Inventors: Ji-Su Kang, Seoul (KR); Tae-Min Choi, Daejeon (KR)

(73) Assignee: KLLEON INC., Seoul (KR)

( * ) Notice: Subject to any disclaimer, the term of this patent is extended or adjusted under 35 U.S.C. 154(b) by 0 days.

(21) Appl. No.: 18/009,990

(22) PCT Filed: Jun. 7, 2022

(86) PCT No.: PCT/KR2022/007979
§ 371 (c)(1),
(2) Date: Dec. 13, 2022

(87) PCT Pub. No.: WO2022/260385
PCT Pub. Date: Dec. 15, 2022

(65) Prior Publication Data
US 2024/0249448 A1    Jul. 25, 2024

(30) Foreign Application Priority Data
Jun. 7, 2021 (KR) .................. 10-2021-0073798

(51) Int. Cl.
*G09G 5/02* (2006.01)
*G06T 5/60* (2024.01)
*G06T 7/194* (2017.01)
*G06T 11/00* (2006.01)

(52) U.S. Cl.
CPC .............. *G06T 11/001* (2013.01); *G06T 5/60* (2024.01); *G06T 7/194* (2017.01); *G06T 2207/20084* (2013.01); *G06T 2207/30201* (2013.01)

(58) Field of Classification Search
CPC .... G09G 5/02; G09G 5/06; G09G 2320/0666; G09G 2340/06; G09G 3/20;
(Continued)

(56) References Cited

U.S. PATENT DOCUMENTS

| 8,817,115 B1 * | 8/2014 | Venkatachalam .... G01N 15/147 348/208.4 |
| 11,335,069 B1 * | 5/2022 | Savchenkov ......... G06T 11/001 |

(Continued)

FOREIGN PATENT DOCUMENTS

| JP | 6747443 B2 | 8/2020 |
| JP | 2021073619 A | 5/2021 |

(Continued)

OTHER PUBLICATIONS

KR10-2021-0073798 Decision of Rejection dated Apr. 19, 2022.
(Continued)

*Primary Examiner* — Gordon G Liu (57) ABSTRACT

A method and a device for synthesizing a background and a face by considering a face shape and using a deep learning network are proposed. The method and the device are characterized to receive an input of an original image and a converted face image, remove a central part from the original image, remove edges so that a central part remains in the converted face image, and then extract a feature vector from each image to perform image synthesis.

10 Claims, 12 Drawing Sheets

(58) Field of Classification Search
CPC ..... G09G 2320/0626; G09G 2360/144; G09G 2360/16; G09T 11/001; G06F 2200/1614; G06F 2200/1637; G06T 11/001; G06T 11/20; G06T 11/40; G06T 11/60; G06T 11/00; G06T 5/60; G06T 2207/20084; G06T 2207/30201; G07T 7/194
USPC .......................................................... 345/589
See application file for complete search history.

(56) References Cited

U.S. PATENT DOCUMENTS

| | | | | |
|---|---|---|---|---|
| 2012/0311623 | A1* | 12/2012 | Davis .................... | H04N 5/765 |
| | | | | 725/18 |
| 2020/0334867 | A1 | 10/2020 | Chen et al. | |
| 2021/0287439 | A1* | 9/2021 | Goodrich ................ | G06T 7/194 |
| 2021/0327038 | A1* | 10/2021 | Helminger .............. | G06T 9/002 |

FOREIGN PATENT DOCUMENTS

| | | | |
|---|---|---|---|
| KR | 1020130120175 | A | 11/2013 |
| KR | 102236904 | B1 | 3/2021 |

OTHER PUBLICATIONS

KR10-2021-0073798 Office Action dated on Dec. 8, 2021.
Free-Form Image Inpaining with Gated Convolution dated on Oct. 22, 2019.
PCT/KR2022/007979 Search Report dated on Sep. 2, 2022.
PCT/KR2022/007979 Written Opinion dated on Sep. 2, 2022.

* cited by examiner

METHOD AND DEVICE FOR SYNTHESIZING BACKGROUND AND FACE BY CONSIDERING FACE SHAPE AND USING DEEP LEARNING NETWORK

CROSS REFERENCE TO RELATED APPLICATIONS

This application is a 371 National Stage application of International Application No. PCT/KR2022/007979 dated Jun. 7, 2022 which claims priority of Korea Patent (KR) application Serial Number 10-2021-0073798, filed on Jun. 7, 2021, all of which are incorporated herein by reference in their entireties.

TECHNICAL FIELD

The present disclosure relates to a method and device for synthesizing a background and a face by using artificial intelligence technology. More particularly, the present disclosure relates to a method and device for synthesizing a background of a first image and a face of a second image by using a deep learning network.

BACKGROUND ART

Face conversion technology using artificial intelligence has been developed to a level that may generate a converted face with high resolution. The face conversion technology may be provided to a user in various ways. For example, the user may synthesize the converted face with the user's own desired background, and accordingly, may cause the user's own face or someone else's face to be displayed on the user's own desired background. The user may also change a face of a famous person in a video to the user's own face or someone else's face. However, for example, the face conversion technology is focused on converting a face of a person B who imitates facial expression and a face angle of a person A, so there is a problem in that the person B's face and background, which are converted from a composite image or video, are distorted.
(Patent Document 1) Korean Patent No. 10-1871662

DISCLOSURE

Technical Problem

An objective of the present disclosure is to provide a method and device capable of naturally synthesizing a converted face with a background of another image without extracting only the converted face from an image including the converted face.

Technical Solution

The embodiment of the present disclosure includes: receiving an input of an original image and a converted face image; removing a first central part including an original face in the original image from the original image to leave a background; removing a background from the converted face image to leave a second central part including a converted face; and performing image synthesis by extracting a feature vector from the original image and the converted face image.

Preferably, the present disclosure may further include performing color correction on the converted face image before removing the background of the converted face image.

Preferably, the performing of the color correction may include adding noise for randomly converting at least one of brightness, contrast, saturation, and illuminance of the converted face image.

Preferably, the performing of the image synthesis may include: extracting an extended feature vector through convolution with a convolution filter; extracting gate activity through convolution with a gate filter; and extracting a final feature vector through multiplication of the extended feature vector and the gate activity.

Preferably, the performing of the image synthesis may further include performing skip connection on the extracted final feature vector.

Preferably, the first central part of the original image may be an internal image of a preset place from upper, lower, left, and right boundaries of the original image. The background of the converted face image may be an external image of a preset place from upper, lower, left, and right boundaries of the converted face image, and the preset place may be a ⅛th place.

The embodiment of the present disclosure is a device of synthesizing a background and a face by considering a face shape and using a deep learning network, the device including: a reception unit configured to receive an input of an original image and a converted face image; a data pre-processing unit configured to remove, from the original image, a first central part including an original face in the original image to leave a background, and remove a background from the converted face image to leave a second central part including a converted face; and an image restoration unit configured to perform image synthesis by extracting a feature vector from the original image and the converted face image, which are input from the data pre-processing unit.

Preferably, the data pre-processing unit may perform color correction on the converted face image before removing the background of the converted face image.

Preferably, the data pre-processing unit may add noise for randomly converting at least one of brightness, contrast, saturation, and illuminance of the converted face image.

Preferably, the image restoration unit may extract an extended feature vector through convolution with a convolution filter, extract gate activity through convolution with a gate filter, and extract a final feature vector through multiplication of the extended feature vector and the gate activity.

Preferably, the image restoration unit may perform skip connection on the final feature vector extracted from a deep neural network.

Preferably, the first central part of the original image may be an internal image of a preset place from upper, lower, left, and right boundaries of the original image. The background of the converted face image may be an external image of a preset place from upper, lower, left, and right boundaries of the converted face image, and the preset place may be a ⅛th place.

Preferably, the image restoration unit may use an adversarial neural network (GAN) when image restoration is performed.

Advantageous Effects

According to the present disclosure, when a background of an original image and a face generated through the face conversion technology, that is, a converted face, are synthesized, image synthesis may be performed without losing information on a form of a face (i.e., a face shape) converted when the converted face is synthesized, and the background of the original image and the converted face may be synthesized naturally.

According to the present disclosure, since there is no need to use an additional network such as a face shape extraction network, image restoration may be performed quickly and accurately.

DESCRIPTION OF THE REFERENCE NUMERALS IN THE DRAWINGS

1: device for synthesizing background and face
10: reception unit
20: data pre-processing unit
30: data combination unit
40: image restoration unit
41: feature vector extraction unit
42: skip-connection storage unit
43: skip-connection combination unit
44: image generation unit
50: image post-processing unit

MODE FOR INVENTION

Hereinafter, the present disclosure will be described in detail. However, the present disclosure is not restricted or limited by the exemplary embodiments. Objectives and effects of the present disclosure may be naturally understood or more clearly understood by the following description, and the objectives and effects of the present disclosure are not limited only by the following description. In addition, in describing the present disclosure, when it is determined that a detailed description of a known technology related to the present disclosure may unnecessarily obscure the subject matter of the present disclosure, the detailed description thereof will be omitted.

The present disclosure relates to a method and device for naturally synthesizing a converted face with a background of another image (or video) without extracting only the converted face from an image including the converted face. According to the present disclosure, a face shape of the converted face may be taken into consideration, that is, may be preserved.

Figure 1:
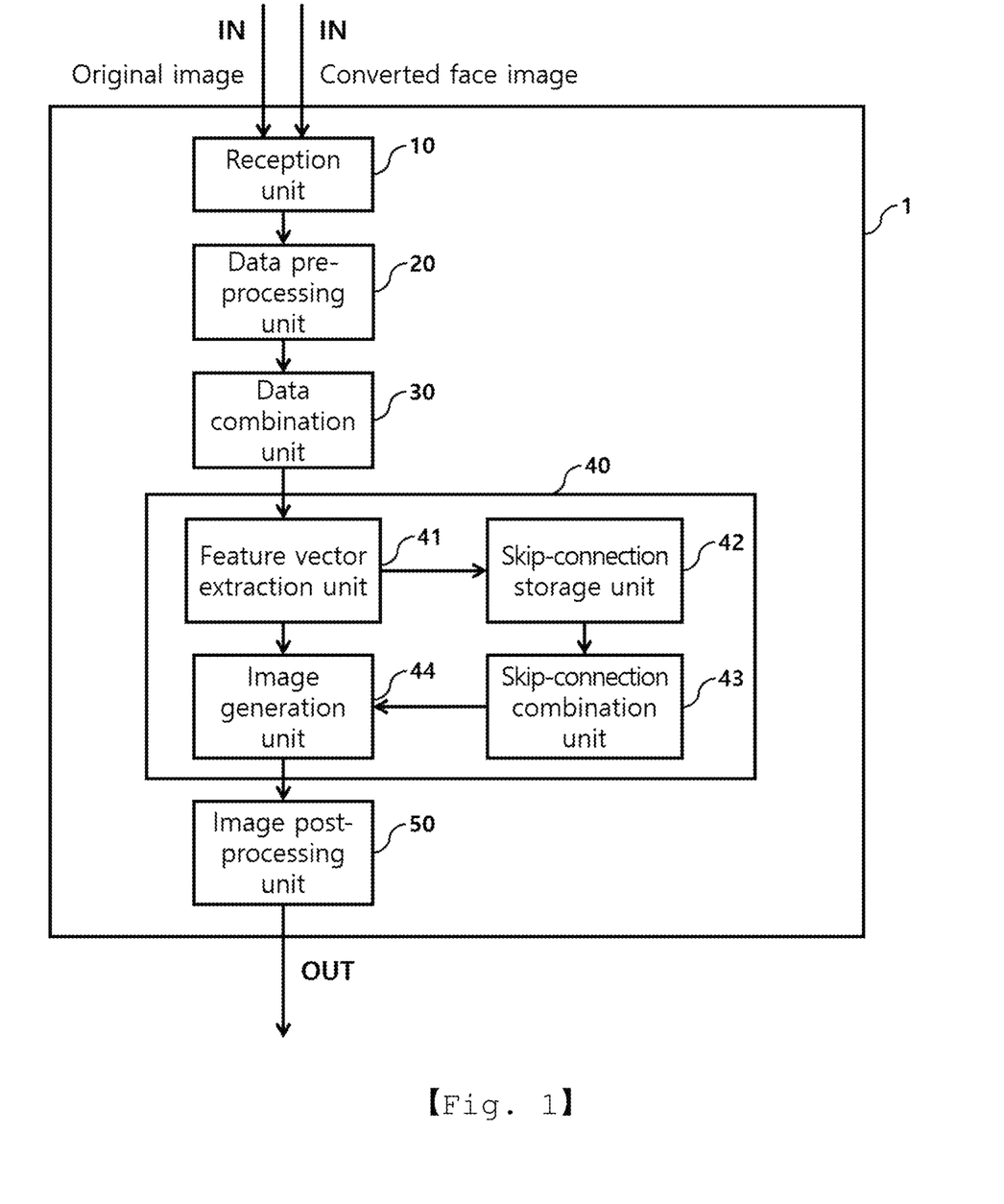
FIG. 1 is a view illustrating a device for synthesizing a background and a face according to an exemplary embodiment of the present disclosure.

FIG. 1 is a view illustrating the device for synthesizing the background and the face according to the exemplary embodiment of the present disclosure. Referring to FIG. 1, the device 1 of synthesizing the background and face may include a reception unit 10, a data pre-processing unit 20, a data combination unit 30, an image restoration unit 40, and an image post-processing unit 50. The image restoration unit 40 may include a feature vector extraction unit 41, a skip-connection storage unit 42, a skip-connection combination unit 43, and an image generation unit 44.

The reception unit 10 may receive, from a user terminal, an original image and a converted face image including a user's own face or someone else's face. Here, the original image may be defined as an image for providing a background when images are synthesized, and the converted face image may be defined as an image when the images are synthesized, more specifically, an image for providing a converted face. That is, in a composite image, the background is provided from the original image, and the face is provided from the converted face image. The converted face image refers to the image converted such that the user's own face or someone else's face, which is included in the converted face image, imitates the expression and angle of a face included in another image.

The data pre-processing unit 20 may perform data amplification and image size alignment on pieces of image data transmitted from the reception unit 10, remove a central part from the original image, and remove edges from the converted face image. The data pre-processing unit 20 may perform color correction on the converted face image. The data combination unit 30 may perform combining of the original image from which the central part is removed and the converted face image from which the edges are removed.

The feature vector extraction unit 41 of the image restoration unit 40 may extract a feature vector from each image through channel-wise gated convolution, extract gate activity through convolution with a gate filter, and extract a final feature vector through multiplication of the extracted values, so as to store the extracted final feature vector in the skip-connection storage unit 42. The skip-connection combination unit 43 may combine the extracted final feature vectors and transmit them to the image generation unit 44. The image generation unit 44 may generate an image synthesized on the basis of the combined final feature vectors. The image post-processing unit 50 may generate a final output image for the generated image.

Figure 2:
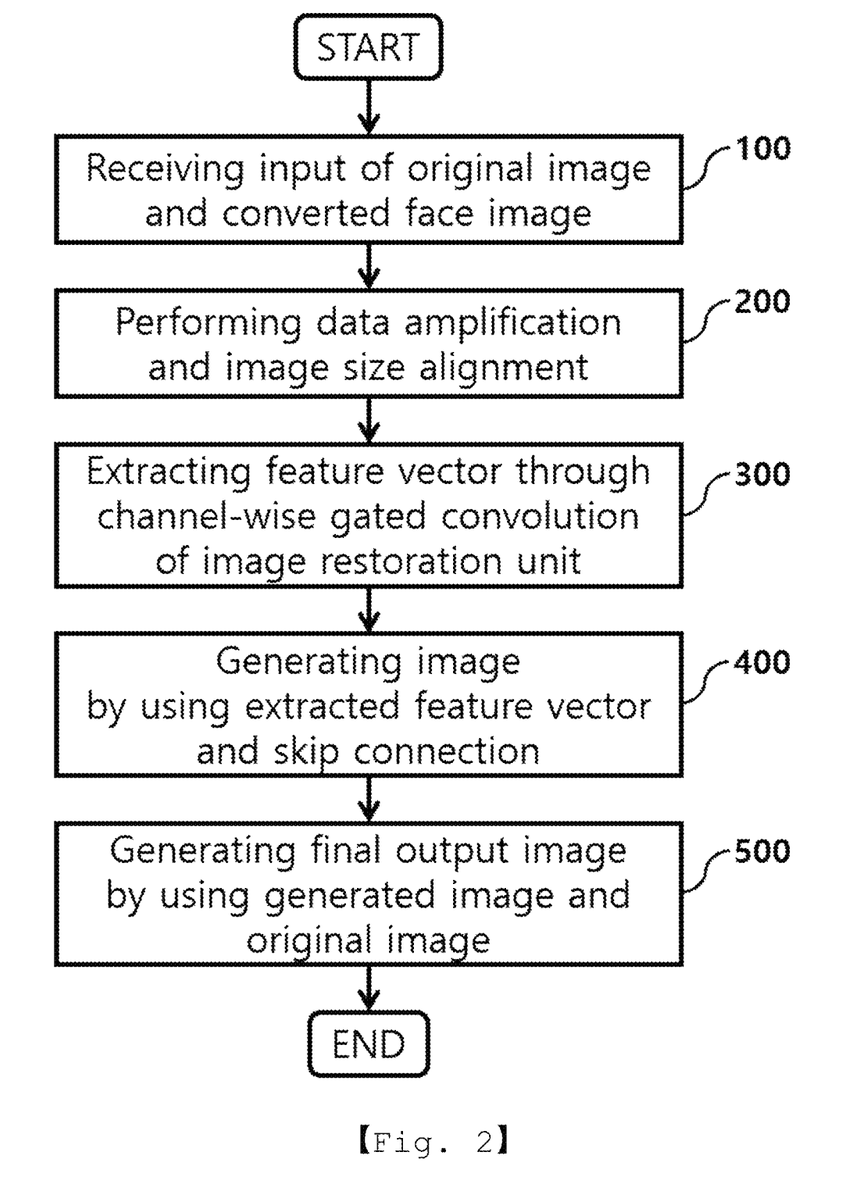
FIG. 2 is a flowchart illustrating a method of synthesizing a background and a face according to the exemplary embodiment of the present disclosure.

FIG. 2 is a flowchart illustrating a method of synthesizing a background and a face according to the exemplary embodiment of the present disclosure. Referring to FIG. 2, in step 100, the reception unit 10 of the device 1 of synthesizing the background and the face may receive an original image and a converted face image. The reception unit may transmit the received original image and the converted face image to the data pre-processing unit 20, and in step 200, the data pre-processing unit 20 may perform data amplification and image size alignment for each of the input original image and the converted face image.

It is preferable that image sizes, face sizes, and face positions are the same in the original image and the converted face image. To this end, 68 feature points (i.e., landmarks) may be extracted from the original image and the converted face image, respectively, and the sizes and positions of the faces may be aligned by using the extracted feature points.

Figure 10:
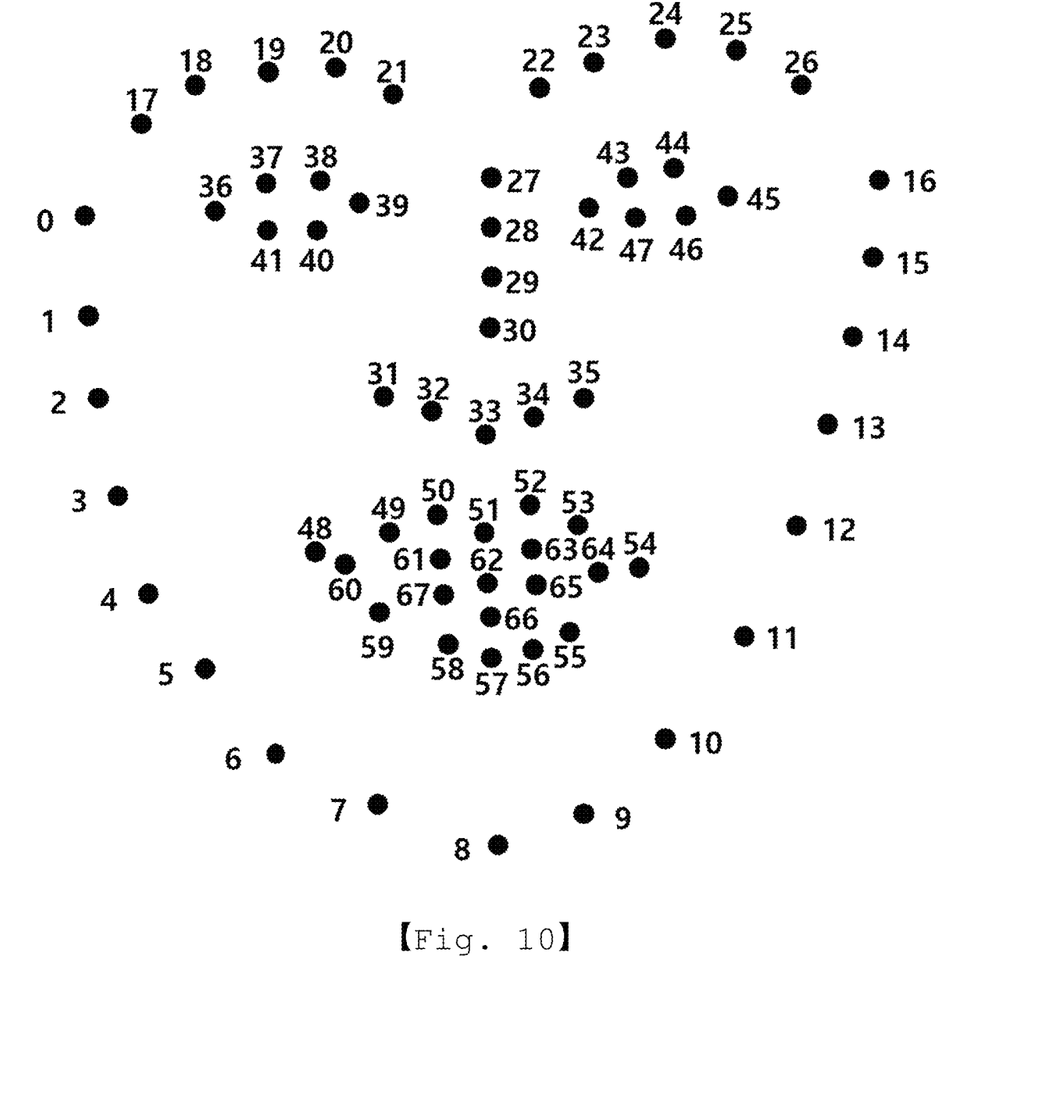
FIG. 10 is a view illustrating 68 feature points on a face according to the exemplary embodiment of the present disclosure.

FIG. 10 is a view illustrating the 68 feature points on a face according to the exemplary embodiment of the present disclosure. Referring to FIG. 10, the 68 feature points that may be extracted from the face are shown, and a number may be assigned to each feature point. Feature points of Nos. 0 to 16 for a face shape, feature points of Nos. 17 to 21 for a left eyebrow, feature points of Nos. 22 to 26 for a right eyebrow, feature points of Nos. 27 to 35 for a nose, feature points of Nos. 36 to 41 for a left eye, feature points of Nos. 42 to 47 for a right eye, feature points of Nos. 48 to 67 for a lip may be derived. After a face position determined by the 68 feature points is fixed in advance and the facial feature points in the original image and the facial feature points in the converted face image are aligned to be closest to the fixed 68 feature points, the size of the face image may be set to a predetermined size. For example, the sizes of all face images may be fixed to one size by converting them to a size of 256×256 pixels.

Figure 8:
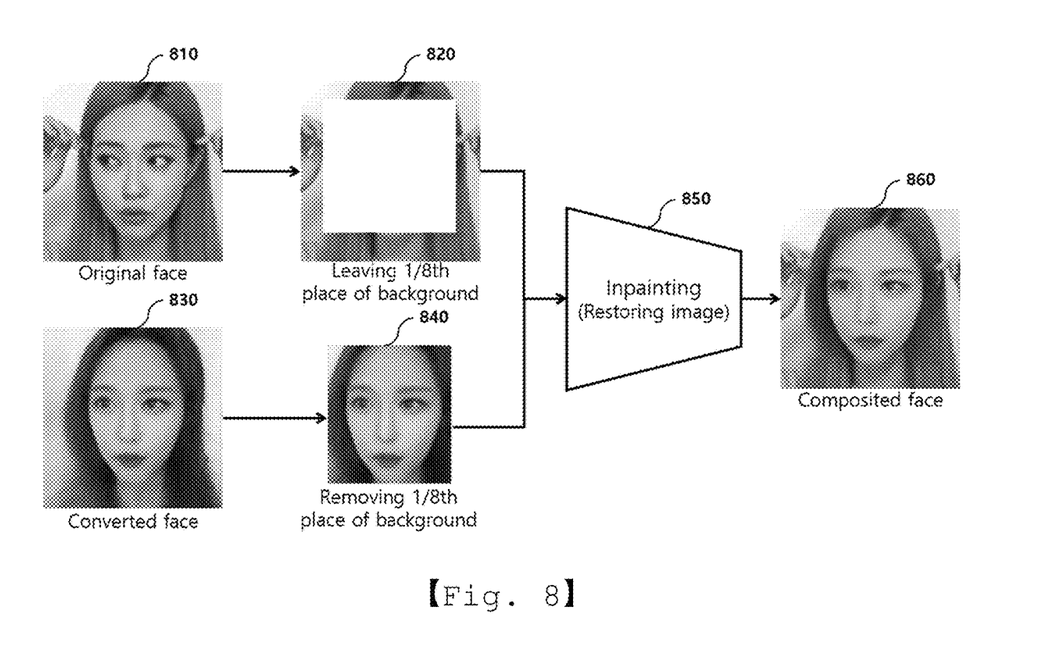
FIG. 8 is a view schematically illustrating the method for synthesizing the background and the face according to the exemplary embodiment of the present disclosure.

FIG. 8 is a view schematically illustrating the method for synthesizing the background and the face according to the exemplary embodiment of the present disclosure. Referring to FIG. 8, image restoration may be performed without cutting the converted face 840 desired to be inserted into the original image 810 to match the face shape of the original face of the original image 810.

From the original image 810, a central part where the original face is positioned, that is, a central part including the original face, may be removed. According to the exemplary embodiment of the present disclosure, the central part may refer to an image positioned inside of a preset place from upper, lower, left, and right boundaries of the original image 810, that is, an internal image (including the original face). According to the specific exemplary embodiment of the present disclosure, the preset place may be, for example, a ⅛th place. The central part may be removed in a form of a square, or may also be removed in a form of a rectangle, a circle, or the like. The remaining image excluding the central part from the original image 810 corresponds to a background 820 and correspond to the edges of the original image 810 when the position of the central part is considered. According to the exemplary embodiment of the present disclosure, the background 820 may refer to an image positioned outside of the preset place from the upper, lower, left, and right boundaries of the original image 810, that is, an external image (not including the original face). The background may be left by removing the central part from the original image 810.

From the converted face image 830, the remaining image excluding the central part 840 in which the converted face is positioned, that is, the central part 840 including the converted face, may be removed. The remaining image excluding the central part 840 from the converted face image 830 corresponds to the background, and corresponds to the edges of the converted face image 840 when the position of the central part 840 is considered. By removing the background from the converted face image 830, the converted face image 840 may be left. According to the exemplary embodiment of the present disclosure, the central part may refer to the image positioned inside of the preset place from the upper, lower, left, and right boundaries of the converted face image 830, that is, the internal image (including the converted face). In addition, the background may refer to the image positioned outside of the preset place from the upper, lower, left, and right boundaries of the converted face image 830, that is, the external image (not including the converted face).

In the original image 810, after the background 820, which is the external image of the preset place from the upper, lower, left, and right boundaries, and the central part 840, which is the internal image of the preset place from the upper, lower, left, and right boundaries in the converted face image 830, are overlapped in a channel direction, the background 820 of the original image 810 and the converted face 840 are combined through the image restoration 850, so that a composite image may be generated.

As described above, a preset place from the upper, lower, left, and right boundaries may be cut in each image. The preset place in the original image is preferably a place where the original face may be included in the internal image and the background may be included in the external image. The original face may be included in the internal image as a whole, and the preset place is more preferable to be the place where the background may be included in the external image as much as possible. The preset place in the converted face image is preferably a place where the converted face may be included in the internal image and the background may be included in the external image. The preset place is more preferable to be the place where the converted face may be included in the internal image as a whole and the background is not included in the external image as little as possible.

According to the exemplary embodiment of the present disclosure, the preset place may be a 1/n-th place from the upper, lower, left, and right boundaries of the image. n may be a real number greater than 1 or a real number greater than or equal to 2, 3, 4, 5, 6, 7, 8, or 9, and is not limited to a natural number. n may be set in consideration of the size of a face on each image. According to the specific exemplary embodiment of the present disclosure, the preset place may be, for example, a ⅛th place. The central part may be in the form of a square, or may be in the form of a rectangle, a circle, or the like.

The ⅛th place according to the specific exemplary embodiment of the present disclosure corresponds to one of the places where the original face is included in the internal image (i.e., the central part) as a whole in the original image while the background may be included in the external image (i.e., the edges) as much as possible, and also corresponds to one of the places where the converted face or face shape is included in the internal image (i.e., the central part) in the converted face image while the background may be included in the external image (i.e., the edges) as little as possible. Numerically, the preset place in the original image and the preset place in the converted face image may be the same as the ⅛th place described above.

Unlike the related art, the present disclosure may perform image restoration with reference to the converted face by inputting the converted face desired to be synthesized into the original image together with the background as a condition of a face conversion network of the image restoration unit 40.

Referring back to FIG. 2, in step 300, the data combination unit 30 may perform combination on the pre-processed original image and the converted face image, and then input the composite image to the image restoration unit 40, and also the data combination unit 30 may overlap the background of the original image and the central part of the converted face image to convert the overlapped image into six-channel data, and then transmit the six-channel data to the image restoration unit 40. The image restoration unit 40 may extract a feature vector through channel-wise gated convolution. In step 400, an image may be generated through the extracted feature vector and skip connection, and transmitted to the image post-processing unit 50. In step 500, the image post-processing unit 50 may output a restored three-channel final image by using the generated image and the original image.

Figure 9:
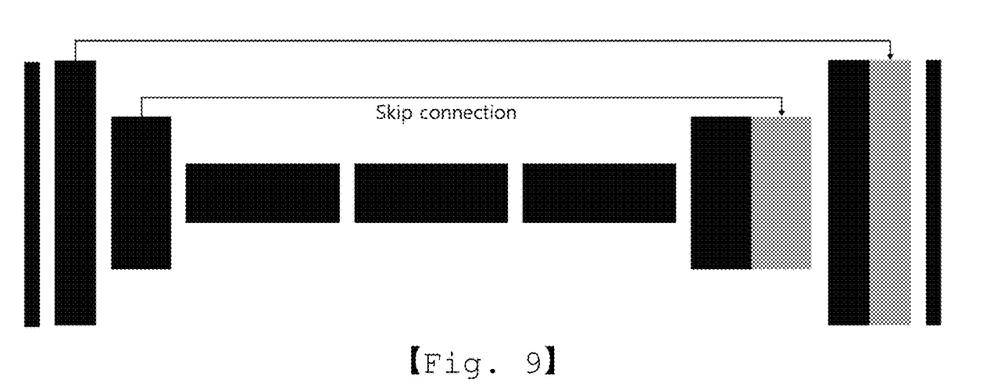
FIG. 9 is a view illustrating skip connection in a neural network according to the exemplary embodiment of the present disclosure.

Here, skip connection will be described with reference to FIG. 9. FIG. 9 is a view illustrating the skip connection in a neural network according to the exemplary embodiment of the present disclosure. Referring to FIG. 9, a network structure may be implemented by using the skip connection, so that a deep neural network may better transmit input information to an output without losing the input information. That is, through the skip connection, a more accurate image may be restored from a deep feature map by training spatial information from an image before becoming smaller.

Meanwhile, when a three-channel image is restored by using the generated six-channel data, the image restoration unit 40 should select which pixel among the pixels of the background image and converted face image to refer to. To this end, gated convolution or channel-wise gated convolution, which allows to select a channel for each pixel, may be used.

Figure 11:
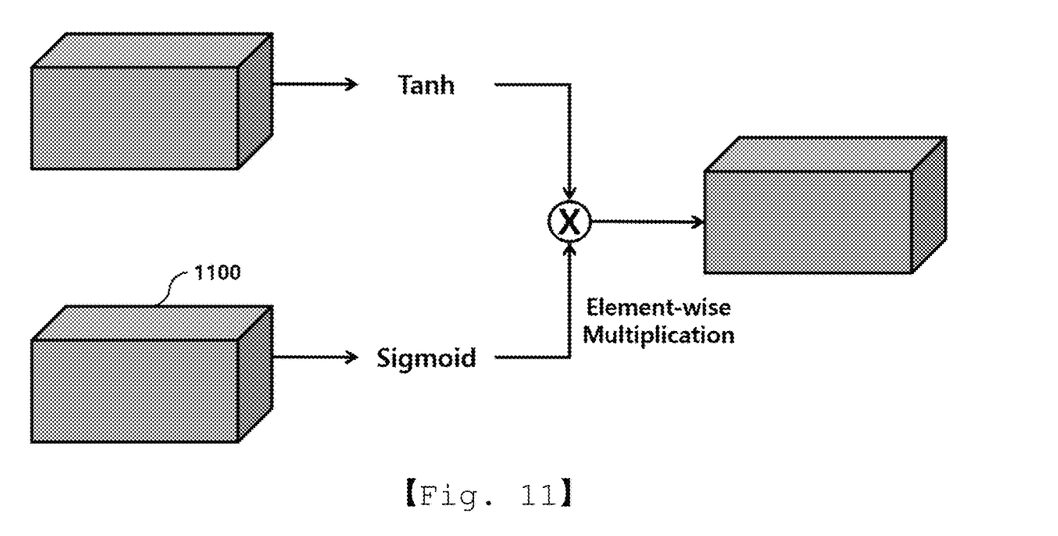
FIG. 11 is a view illustrating a gated convolution neural network according to the exemplary embodiment of the present disclosure.

FIG. 11 is a view illustrating a gated convolution neural network according to the exemplary embodiment of the present disclosure. Referring to FIG. 11, since the gated convolution performs calculation with a gate 1100 for each pixel, the amount of computation is inevitably large.

Figure 12:
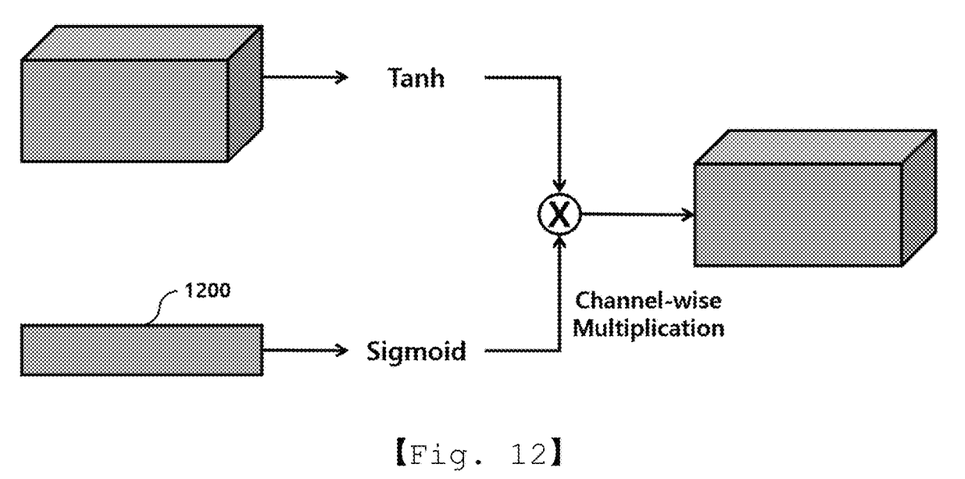
FIG. 12 is a view illustrating a channel-wise gated convolution neural network according to the exemplary embodiment of the present disclosure.

FIG. 12 is a view illustrating a channel-wise gated convolution neural network according to the exemplary embodiment of the present disclosure. Referring to FIG. 12, since the channel-wise gated convolution performs calculation with a gate 1200 for each channel, there is an advantage in that the image restoration performance may be improved while reducing the calculation. For example, when an input of an image restoration network in the image restoration unit 40 is C×H×W (where, C is the number of channels, H is height, W is width), the gated convolution requires C×H×W pieces of gates. Whereas, the channel-wise gated convolution requires C pieces of gates, thereby reducing the number of calculations.

The image restoration unit 40 may use a generative adversarial network (GAN) to generate a more naturally restored image. An adversarial neural network is a network designed to deceive a discriminator, which is trained to discriminate a restored image from a real face image, by the image restoration network. When the adversarial neural network is used, image restoration performance may be increased. A general discriminator discriminates images by comparing the whole restored image with the whole actual image, but in the present disclosure, since small parts of the restored image and small parts of the actual image are compared and discriminated, the image restoration network may force even the small parts of the image to be perfectly generated.

As shown in FIGS. 2 and 8, since a face region is not required to be accurately extracted from the input image, face synthesis may be performed without using a face extraction network that is generally used for the face synthesis. In addition, since the converted face is extracted by including the converted face in the central part in a certain shape without cutting the converted face to fit the face shape of a person in the original image, the face synthesis may be performed while maintaining the face shape generated through the conversion technology.

Figure 3:
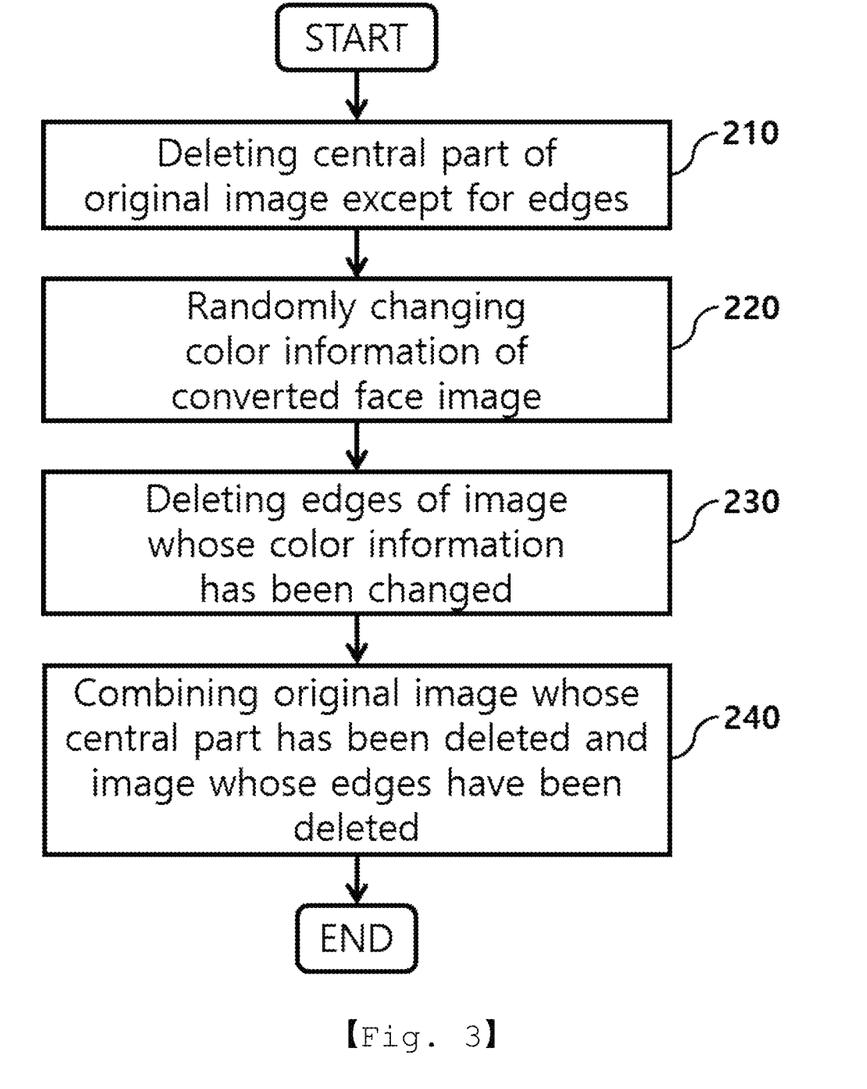
FIG. 3 is a flowchart illustrating a method of pre-processing data and combining data according to the exemplary embodiment of the present disclosure.

FIG. 3 is a flowchart illustrating a method of pre-processing data and combining data according to the exemplary embodiment of the present disclosure. Referring to FIG. 3, the data pre-processing unit 20 may delete the central part at a preset ratio from the original image in step 210, and randomly change color information of the converted face image in step 220. Accordingly, in the restored image, that is, the image including the background of the original image and the converted face, the color information of the background and the color information of the face may be naturally linked together. To this end, noise for randomly changing the color information of the converted face image desired to be synthesized to the original image is added through the face conversion network of the image restoration unit 40. More specifically, noise for randomly converting at least one of brightness, contrast, saturation, and illuminance of the converted face image may be added. Whether to randomly convert any information may be determined differently depending on the color information of the converted face image. An example of randomly changing the color information of the converted face image is referred to in FIG. 4 as an example.

Figure 4:
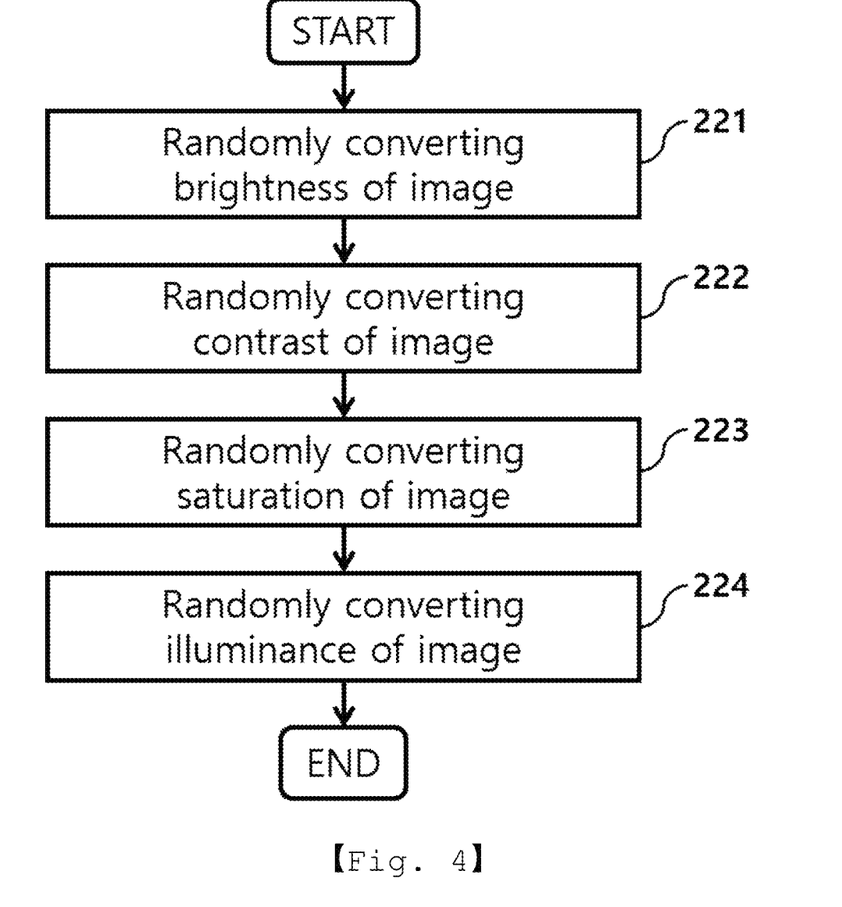
FIG. 4 is a flowchart illustrating a method of converting color information of a converted face image according to the exemplary embodiment of the present disclosure.

FIG. 4 is a flowchart illustrating a method of converting the color information of the converted face image according to the exemplary embodiment of the present disclosure. Referring to FIG. 4, the data pre-processing unit 20 may randomly apply changes in brightness, contrast, saturation, and illuminance to the converted face image. In step 221, the brightness of the converted face image may be randomly converted, and in step 222, the contrast of the converted face image may be randomly converted. In step 223, the saturation of the converted face image may be randomly converted, and in step 224, the illuminance of the converted face image may be randomly converted.

Referring back to FIG. 3, in step 230, the background of the converted face image in which the color information is changed may be deleted, and then, the pre-processed original image and the converted face image may be transmitted to the data combination unit 30. Meanwhile, according to the exemplary embodiment of the present disclosure, an order between step 220 of randomly changing the color information of the converted face image and step 230 of deleting the background of the converted face image in which the color information is changed may be changed each other. That is, after deleting the background of the converted face image, the color information of the converted face image may be changed randomly. The reason is that the background is eventually deleted from the converted face image. Thereafter, in step 240, the data combination unit 30 may combine the original image of which the central part is deleted and the converted face image of which the central part is left.

Figure 5:
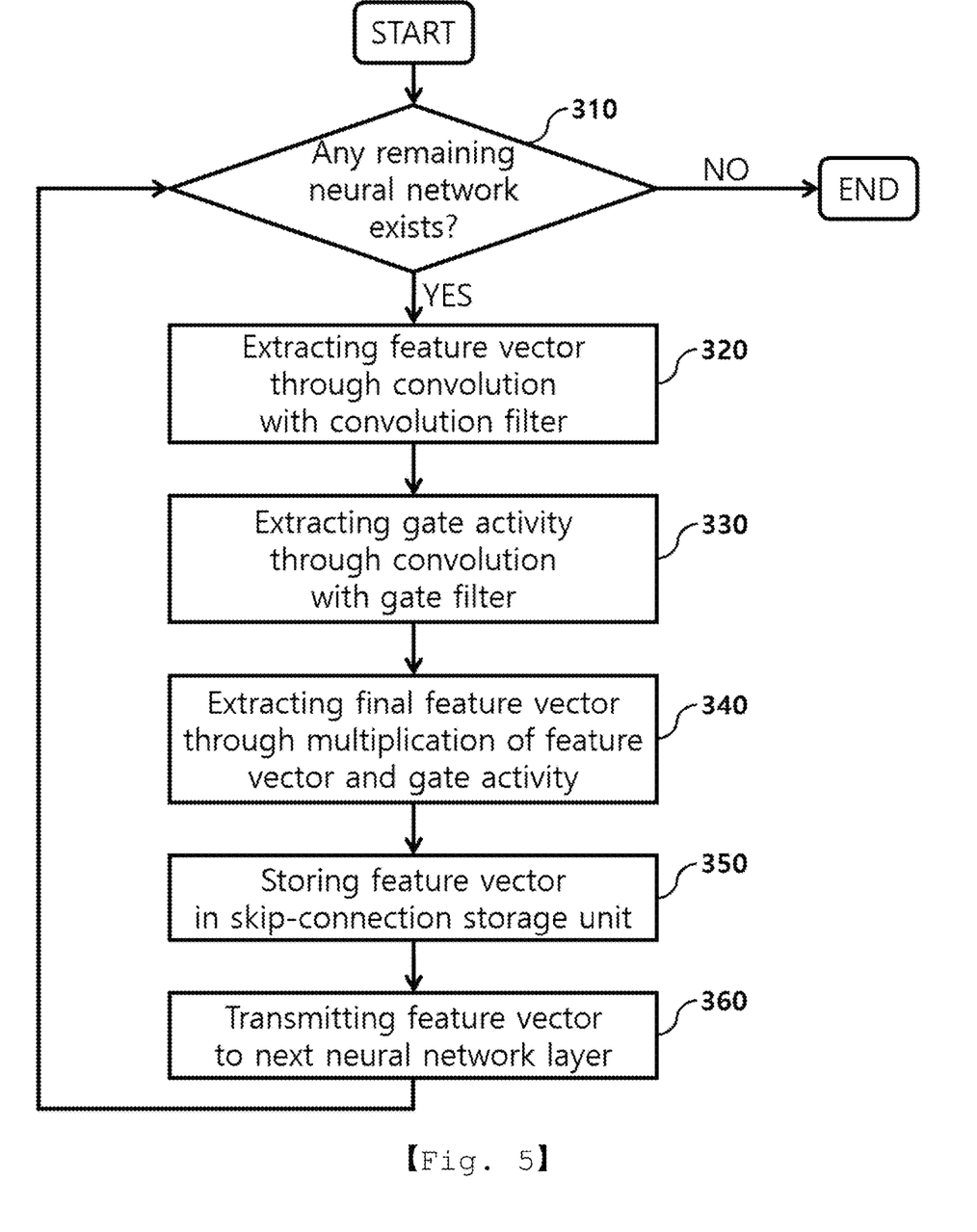
FIG. 5 is a flowchart illustrating a method of restoring an image by an image restoration unit according to the exemplary embodiment of the present disclosure.

FIG. 5 is a flowchart illustrating a method of restoring an image by the image restoration unit according to the exemplary embodiment of the present disclosure. The exemplary embodiment of FIG. 5 illustrates an encoder part configured to extract a feature vector while gradually reducing the size of an image by using a convolution filter, and store the extracted feature vector in skip-connection storage unit. Referring to FIG. 5, the feature vector extraction unit 41 of the image restoration unit 40 may extract a feature vector from a plurality of neural network layers in order to extract the feature vector from the composite image received from the data combination unit 30.

More specifically, in step 310, whether a remaining neural network exists or not is determined, and when it is determined that the remaining neural network exists, the current step may proceed to step 320 and a feature vector may be extracted through convolution with the convolution filter. In step 330, gate activity may be extracted through the convolution with the gate filter, and in step 340, a final feature vector may be extracted through multiplication of the extended feature vector and the gate activity. In step 350, the extracted final feature vector may be stored in the skip-connection storage unit 42, and in step 360, the feature vector may be transmitted to a next neural network layer. In step 310, whether the remaining neural network exists or not is determined, and when it is determined that the remaining neural network does not exist, the image restoration process may be terminated.

Figure 6:
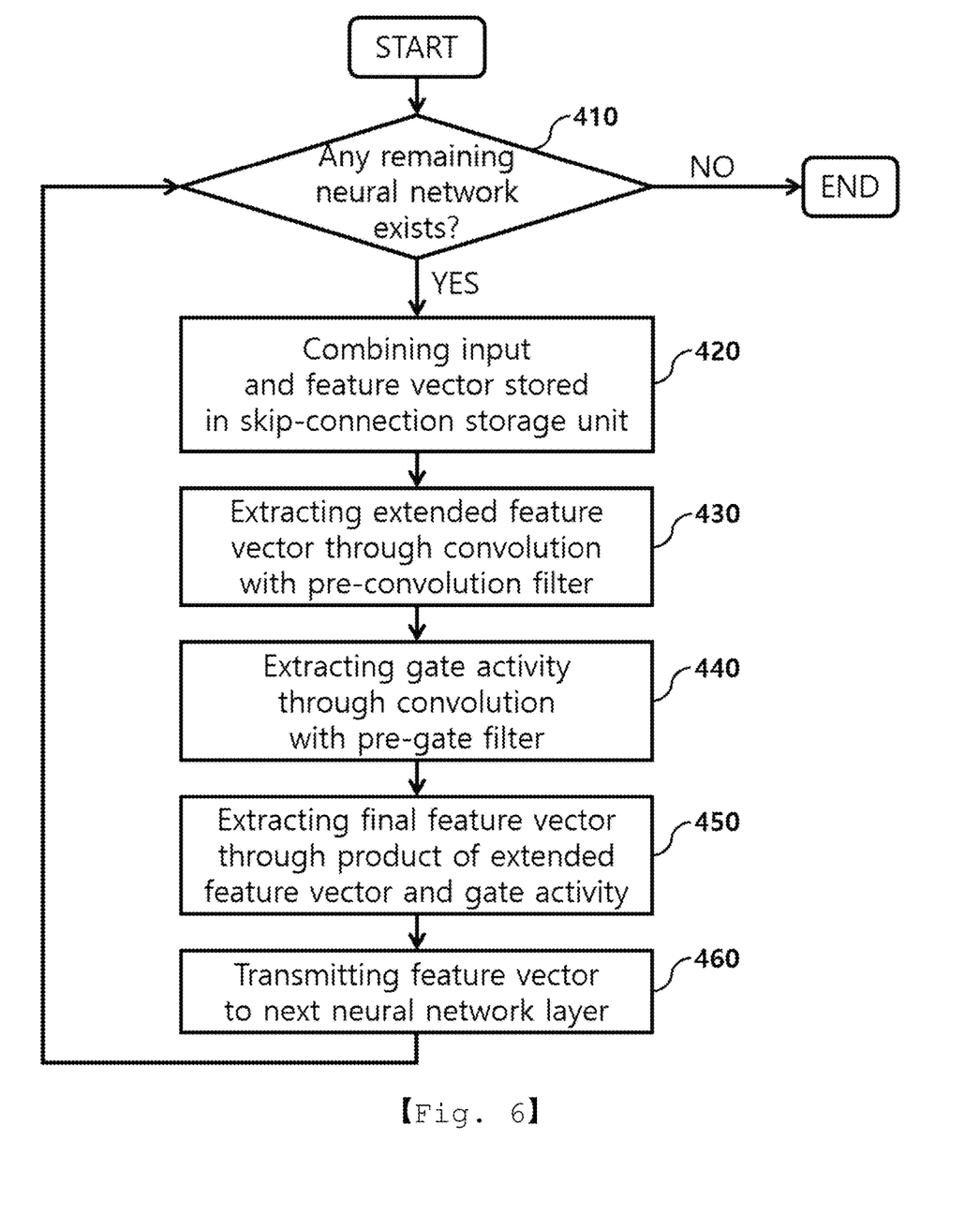
FIG. 6 is a flowchart illustrating a method of restoring an image by an image restoration unit according to another exemplary embodiment of the present disclosure.

FIG. 6 is a flowchart illustrating a method of restoring an image by the image restoration unit according to another exemplary embodiment of the present disclosure. The exemplary embodiment of FIG. 6 is an example of a decoder part configured to use a pre-convolution filter to increase, to a size of each original image, a size of an image whose size has been reduced, and generate an image by using feature vectors stored in the skip-connection storage unit. Referring to FIG. 6, in step 410, the feature vector extraction unit 41 of the image restoration unit 40 may determine whether a remaining neural network exists or not, and proceed to step 420 when it is determined that the remaining neural network exists, so as to combine an input from the skip-connection combination unit 43 and the feature vectors stored in the skip-connection storage unit 42. In step 430, an extended feature vector may be extracted through convolution with the pre-convolution filter, and in step 440, gate activity may be extracted through convolution with the pre-gate filter. In step 450, a final feature vector may be extracted through multiplication of the extended feature vector and the gate activity. In step 460, the extracted final feature vector may be transmitted to a next neural network layer. In step 410, whether the remaining neural network exists or not is determined, and when it is determined that the remaining neural network does not exist, the image restoration process is terminated.

Figure 7:
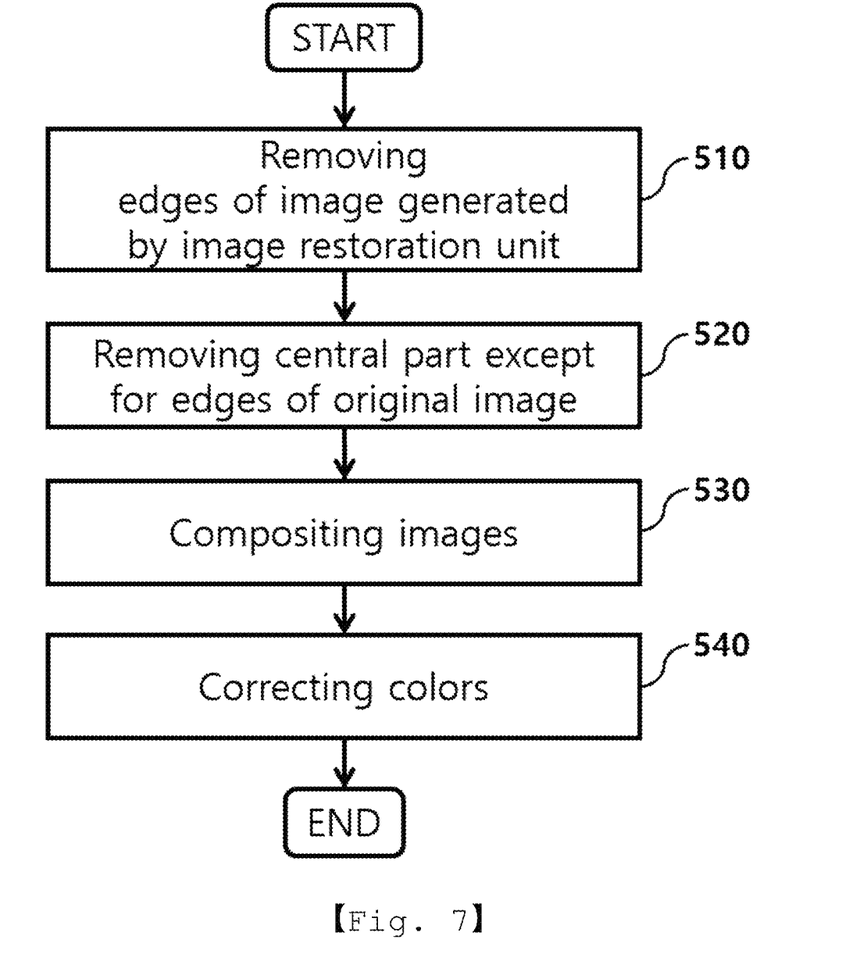
FIG. 7 is a flowchart illustrating a processing method of an image post-processing unit according to the exemplary embodiment of the present disclosure.

FIG. 7 is a flowchart illustrating a processing method of an image post-processing unit according to the exemplary embodiment of the present disclosure. Referring to FIG. 7, the image post-processing unit 50 may remove edges of the image transmitted from the image generation unit 44 of the image restoration unit 40 in step 510, and may remove the central part of the image except for the edges of the original image in step 520. Thereafter, in step 520, image synthesis is performed, and in step 540, color correction is performed to finally output a synthesized face image. That is, although the image generated by the image generation unit 44 is in a state of having the background generated therein as well, it is more accurate to use the background of the original image rather than that of the generated image. Accordingly, post-processing may be performed once again in order to use the background of the original image instead of the image generated by the image generation unit 44.

As described above, the method and device for synthesizing the background and the face in consideration of the face shape according to the exemplary embodiment of the present disclosure may enable the image synthesis without losing information on the generated face shape when compositing the background of the original image and the face generated through the face conversion technology. In addition, since there is no need to use an additional network such as the face extraction network, fast and accurate image restoration may be possible.

Meanwhile, the present disclosure may be implemented by using computer-readable codes on a computer-readable recording medium. The computer-readable recording medium includes all types of recording devices in which data readable by a computer system is stored. Examples of the computer-readable recording medium include a ROM, a RAM, a CD-ROM, a magnetic tape, a floppy disk, an optical data storage device, etc.

In addition, the computer-readable recording media is distributed in networked computer systems, and computer-readable codes may be stored and executed in a distributed manner. In addition, functional programs, codes, and code segments for implementing the present disclosure may be easily inferred by those programmers in the art to which the present disclosure pertains.

The steps may be performed in an appropriate order unless the order for the steps constituting the method according to the present disclosure is explicitly stated or there is no description to the contrary. The present disclosure is not necessarily limited to the orders in which the steps are described.

The use of all examples or exemplary terminology (e.g., etc.) in the present disclosure is merely for the purpose of describing the present disclosure in detail, and unless limited by the claims, the scope of the present disclosure is not limited by the above examples or exemplary terminology. In addition, those skilled in the art can appreciate that various modifications, combinations, and changes may be made according to design conditions and factors within the scope of the appended claims or equivalents thereof.

Therefore, the spirit of the present disclosure should not be limited to the described exemplary embodiments, and all things equal or equivalent to the claims as well as the claims to be described later fall within the scope of the concept of the present disclosure.

The present disclosure has been described with reference to the exemplary embodiment shown in the drawings, but these are only exemplary, and those skilled in the art will appreciate that various modifications and embodiments are possible. Therefore, the true technical protection scope of the present disclosure will be defined by the technical spirit of the appended patent claims.

The invention claimed is:

1. A method of synthesizing a background and a face by considering a face shape and using a deep learning network, the method comprising:
　(a) receiving an input of an original image and a converted face image by a reception unit;
　(b) removing a first central part comprising an original face in the original image from the original image to leave the background by a data preprocessing unit, the first central part being an internal image surrounded by boundaries at a preset distance from upper, lower, left, and right boundaries of the original image;
　(c) correcting colors of the converted face image to link color information of the background of the original image and color information of a second central part comprising a converted face of the converted face image by the data preprocessing unit, the second central part being an internal image surrounded by boundaries at a preset distance from upper, lower, left, and right boundaries of the converted face image;

(d) leaving the second central part by removing the background from the converted face image, so as not to extract only the converted face from the converted face image by the data preprocessing unit;

(e) overlapping and converting the background of the original image and the second central part of the converted face image into six-channel data by a data combination unit;

(f) extracting a feature vector from the six-channel data to generate a three-channel composite image by a data restoration unit; and (g) recompositing a central part of the composite image comprising the converted face with the background of the original image after removing the background of the composite image derived from the original image by an image post-processing unit.

2. The method of claim 1, wherein step (c) comprises:
adding noise for randomly converting at least one of brightness, contrast, saturation, and illuminance of the converted face image.

3. The method of claim 1, wherein step (f) comprises:
(f1) extracting an extended feature vector through convolution with a convolution filter;
(f2) extracting gate activity through convolution with a gate filter; and
(f3) extracting a final feature vector through multiplication of the extended feature vector and the gate activity.

4. The method of claim 3, wherein step (f) further comprises performing skip connection on the extracted final feature vector, and
the image restoration unit uses an adversarial neural network (GAN) when image restoration is performed.

5. The method of claim 1, wherein the first central part of the original image is the internal image surrounded by boundaries at ⅛th distance from the upper, lower, left, and right boundaries of the original image, and
the background of the converted face image is the external image surrounded by boundaries at ⅛th distance from the upper, lower, left, and right boundaries of the converted face image and the upper, lower, left, and right boundaries of the converted face image.

6. A device of synthesizing a background and a face by considering a face shape and using a deep learning network, the device comprising:
a reception unit configured to receive an input of an original image and a converted face image;
a data preprocessing unit configured to remove a first central part comprising an original face in the original image from the original image to leave the background, the first central part being an internal image surrounded by boundaries at a preset distance from upper, lower, left, and right boundaries of the original image, correct colors of the converted face image to link color information of the background of the original image and color information of a second central part comprising a converted face of the converted face image, the second central part being an internal image surrounded by boundaries at a preset distance from upper, lower, left, and right boundaries of the converted face image, and leave the second central part by removing the background from the converted face image, so as not to extract only the converted face from the converted face image;
a data combination unit configured to overlap and convert the background of the original image and the second central part of the converted face image into six-channel data;
a data restoration unit configured to extracting a feature vector from the six-channel data to generate a three-channel composite image; and
an image post-processing unit configured to recomposite a central part of the composite image comprising the converted face with the background of the original image after removing the background of the composite image derived from the original image.

7. The device of claim 6, wherein, for color correction of the converted face image, the data pre-processing unit adds noise for randomly converting at least one of brightness, contrast, saturation, and illuminance of the converted face image.

8. The device of claim 6, wherein the image restoration unit extracts an extended feature vector through convolution with a convolution filter, extracts gate activity through convolution with a gate filter, and extracts a final feature vector through multiplication of the extended feature vector and the gate activity.

9. The device of claim 8, wherein the image restoration unit performs skip connection on the final feature vector extracted from a deep neural network, and
the image restoration unit uses an adversarial neural network (GAN) when image restoration is performed.

10. The device of claim 6, wherein the first central part of the original image is the internal image surrounded by boundaries at ⅛th distance from the upper, lower, left, and right boundaries of the original image, and
the background of the converted face image is the external image surrounded by boundaries at ⅛th distance from the upper, lower, left, and right boundaries of the converted face image and the upper, lower, left, and right boundaries of the converted face image.

* * * * *